(12) United States Patent
Farhang-Boroujeni et al.

(10) Patent No.: US 6,990,153 B1
(45) Date of Patent: Jan. 24, 2006

(54) METHOD AND APPARATUS FOR SEMI-BLIND COMMUNICATION CHANNEL ESTIMATION

(75) Inventors: Behrouz Farhang-Boroujeni, Salt Lake City, UT (US); Francois Po Shin Chin, Singapore (SG); Chin Keong Ho, Singapore (SG)

(73) Assignees: Agency for Science, Technology and Research, Singapore (SG); National University of Singapore, Singapore (SG)

( * ) Notice: Subject to any disclaimer, the term of this patent is extended or adjusted under 35 U.S.C. 154(b) by 735 days.

(21) Appl. No.: 09/778,306

(22) Filed: Feb. 6, 2001

(51) Int. Cl.
  *H04B 1/38* (2006.01)
(52) U.S. Cl. .................................. 375/260
(58) Field of Classification Search ............ 375/229, 375/230, 259, 260, 377, 219, 285, 296, 346, 375/348, 350; 370/464–468, 487, 498
  See application file for complete search history.

(56) References Cited

U.S. PATENT DOCUMENTS

| | | | | | |
|---|---|---|---|---|---|
| 5,302,914 | A | * | 4/1994 | Arntz et al. ................ | 330/129 |
| 5,841,813 | A | * | 11/1998 | van Nee ..................... | 375/279 |
| 5,907,583 | A | * | 5/1999 | Sakoda et al. .............. | 375/260 |
| 5,909,465 | A | * | 6/1999 | Bottomley et al. .......... | 375/227 |
| 6,125,103 | A | * | 9/2000 | Bauml et al. ................ | 370/203 |
| 6,128,351 | A | * | 10/2000 | Jones et al. ................. | 375/284 |
| 6,130,918 | A | * | 10/2000 | Humphrey et al. ......... | 375/295 |
| 6,144,860 | A | * | 11/2000 | Komatsu ..................... | 455/522 |
| 6,307,892 | B1 | * | 10/2001 | Jones et al. ................. | 375/296 |
| 6,546,256 | B1 | * | 4/2003 | Maloney et al. ......... | 455/404.2 |
| 6,654,431 | B1 | * | 11/2003 | Barton et al. ............... | 375/346 |

OTHER PUBLICATIONS

Miolisavljevic et al., "Fixed Point Algorithm for Bit Rate Optimal Equalization in Multicarrier Systems", IEEE International Conference on Acoustics, Speech, and Signal Processing, ICASSP 1999, vol. 5, Mar. 15-19, 1999, pp. 2515-2518.*

Wang et al., "Joint Channel Estimation and Equalization in Multicarrier Modulation System Using Cyclic Prefix", IEEE International Conference on Acoustics, Speech, and Signal Processing, ICASSP 1999, vol. 5, Mar. 15-19, 1999, pp. 2733-2736.*

* cited by examiner

*Primary Examiner*—Kenneth Vanderpuye

(57) ABSTRACT

In a multi-channel communication system (300) data (306) and pilot data (308) are combined to provide a composite signal comprising discrete data signals (405), each having a data portion (407) and a pilot data portion (409). The composite signal is transmitted and a corresponding composite signal received on a communication channel having varying characteristics. An added pilot semi-blind (APSB) channel estimator (320) and equalizer (330) apply a converging iterative process to estimate the characteristics of the communication channel and the transmitted data.

40 Claims, 7 Drawing Sheets

METHOD AND APPARATUS FOR SEMI-BLIND COMMUNICATION CHANNEL ESTIMATION

FIELD OF THE INVENTION

The present invention relates to multi-carrier communication systems, and more particularly to channel estimation in multi-carrier communication systems that employ orthogonal frequency division multiplexing (OFDM).

BACKGROUND OF THE INVENTION

OFDM is a multi-carrier transmission technique, which divides available frequency spectrum of a communication channel into many carriers, often referred to as sub-carriers; and adjacent sub-carriers are orthogonally phased to each other. Each of the sub-carriers is then modulated by a low rate data stream. As the sub-carriers are packed more closely than, for example, in frequency division multiplexing (FDMA), OFDM allows the frequency spectrum to be used more efficiently. In addition, OFDM does not require complex time switching, as in time division multiplexing (TDMA), and therefore does not suffer the overhead associated with time switching methods.

FIG. 1 shows an OFDM system for transmitting and receiving information. A serial stream of data symbols is provided via input 101 to a serial to parallel converter 102 that converts the single data stream to several parallel data streams. An inverse discrete Fourier transform (IDFT) module 104 processes the parallel data streams and produces a corresponding number of orthogonal modulated sub-carriers which are provided to a parallel to serial converter 106. In response, the parallel to serial converter 106 provides a serial data signal to a cyclic prefix adder 108, and the cyclic prefix adder 108 produces a transmit data signal at output 110, and the transmit data signal is transmitted on a communication channel.

With further reference to FIG. 1, a corresponding received data signal on the communication channel is provided to a cyclic prefix remover 114 via input 112. The cyclic prefix remover 114 removes the cyclic prefix from the received data signal and outputs a single stream of data to a serial to parallel converter 116. Resultant signals from the outputs of the serial to parallel converter 116 are provided to a discrete Fourier transform (DFT) module 118, which provides a corresponding plurality of demodulated data streams to a parallel to serial converter 120. A serial data signal is then provided by the parallel to serial converter 120 to an equalizer 135 and to a channel estimator 130, and the equalizer operates with the channel estimator 130 to determine the originally transmitted data from received data, and provide the received data via an output 135.

The cyclic prefix is employed to address distortion in the communication channel. Adding the cyclic prefix comprises repeating the last few samples of each data symbol at its beginning, prior to its transmission. The length of the cyclic prefix should be chosen to be greater than or equal to the duration of the impulse response of the communication channel. This allows equalization of the channel distortion in the frequency domain by using a single tap scalar equalizer for each carrier, independently. However, in order to do this the response of the communication channel needs to be characterized. In practice only an estimate of the communication channel's characteristics is used, hence the need for a channel estimator.

There are several methods of performing channel estimation, these include the following schemes; Pilot Symbol Assisted Modulation (PSAM), Blind Channel estimation, and a coded pilot method. Each of these is briefly described below.

PSAM adds periodic transmissions of known symbols or pilots. Pilots comprise data that is known by both the transmitter and the receiver. Therefore, communicating pilot symbols allows the receiver to determine the difference between what was transmitted and what was received, and thus compensate for any variations in the received symbols that are caused by transmission between the transmitter and the receiver i.e. the communication channel. An estimate of the characteristics of the communication channel is required to provide such compensation across time and frequency domains of the communication channel. When the time and frequency characteristics of the communication channel are varying rapidly, as in mobile communication applications for example, channel estimation must be performed more frequently, hence the need for more pilots to be transmitted in order to maintain reliable communication. Thus, reducing the available bandwidth for data transmission.

FIG. 2 shows a PSAM scheme graphically, where both pilot symbols 202 and data symbols 204 are shown in a three dimensional grid across time 206 and frequency 208 axes, and where the vertical axis represents transmission power 210 of the data and pilot symbols. In PSAM, the pilot symbols 202 are inserted at intervals across time and frequency between the data symbols 204. Consequently, part of the signal energy and bandwidth of the communication channel is used for transmitting the pilot symbols 202. A received data signal in a PSAM scheme is passed through a 2-D Wiener filter, which essentially performs interpolation based on the statistics of the communication channel so as to estimate the characteristics of the communication channel between the pilot symbols 202, i.e. where the data symbols 204 are received. In this way, the data symbols 204 can be correctly recovered by taking the estimated time and frequency characteristics into consideration to provide channel equalisation. One implementation of the PSAM scheme is in terrestrial transmission in digital video broadcasting (DVB-T).

A PSAM scheme provides good channel estimation even when applied to time variant channels. However, when the normalized maximum Doppler spread is high, caused by fast changes in the communication channel characteristics, the frequency at which pilot symbols are required increases in order to track such fast changes. This results in more bandwidth being required for pilot symbols, up to ten percent of the bandwidth of the communication channel, and leaving less of the bandwidth for data traffic.

Blind channel estimation does not use pilots. Instead, the data symbols themselves are used to estimate the communication channel. Consequently, bandwidth of the communication channel is preserved. Several blind channel estimation schemes for OFDM are known, however, their tracking ability in a communication channel whose characteristics change or vary with time, Rayleigh fading time variant channels, for example, have not been as good as that of the PSAM scheme.

The coded pilot method is described in U.S. Pat. No. 5,912,876 by H'mimy where a main signal, comprising a quadrature amplitude modulated (QAM) version of a signal to be transmitted, and a pilot signal, are coded separately and transmitted as part of an OFDM signal. When the OFDM signal is received, the main signal portion is detected and an estimation of the communication channel is determined from the detected coded pilot signal portion. Then the detected main signal and the estimation of the communication channel are used to estimate the signal that was transmitted. The coded pilot method is simple to implement, and the coding enhances the detection of the main and pilot signals, in the consequent channel estimation process.

However, a transceiver using the coded pilot method is necessarily more complicated due to the coding in the transmitter, and detection of the codes in the receiver. In addition, a portion of the bandwidth of the communication channel needs to be allocated to support the transmission of the coded signals, thus reducing the usable portion of a predetermined bandwidth.

Hence, there is a need for a channel estimation scheme that provides good performance in a communication channel having varying frequency and time characteristics, while preserving the usable bandwidth of the communication channel.

BRIEF SUMMARY OF THE INVENTION

The present invention seeks to provide a method and an apparatus for semi-blind communication channel estimation, which overcomes, or at least reduces the abovementioned problems of the prior art.

Accordingly, in one aspect, the present invention provides a multi-carrier communication system comprising:

a transmitter comprising:
  a data input for receiving an unknown data signal for transmission;
  a known data input for receiving a known data signal;
  a signal power ratio input for receiving a power ratio signal indicating a ratio for combining the unknown data signal and the known data signal; and
  a data combiner coupled to the data input, the known data input and the signal power ratio input, the data combiner for combining the unknown data signal and the known data signal in accordance with the power ratio signal to produce a composite output signal comprising discrete data signals, wherein each discrete data signal comprises at least a portion of the unknown data signal and at least a portion of the known data signal combined in accordance with the power ratio signal, the data combiner having an output adapted to provide the composite output signal to a multi-carrier transmitter, wherein the multi-carrier transmitter transmits a transmit signal on a communication channel, wherein the transmit signal includes the composite output signal; and a receiver comprising:
  a multi-carrier receiver for receiving a receive signal corresponding to the transmit signal on the communication channel, and the multi-carrier receiver having an output for providing a corresponding composite signal, wherein the corresponding composite signal comprises corresponding discrete data signals, and the corresponding composite signal being shaped by at least one signal shaping characteristic of the communication channel;
  a channel estimator having a known data input for receiving the known data signal, an input coupled to receive the corresponding composite signal, an input coupled to receive the power ratio signal, and an input for receiving at least one estimate of the unknown data signal, the channel estimator for estimating the at least one signal shaping characteristic of the communication channel from at least the corresponding composite signal, the at least the portion of the known data signal of at least some of the corresponding discrete data signals, the power ratio signal and the at least one estimate of the unknown data signal, and the channel estimator having an output for providing at least one estimated communication channel characterising signal; and
  an equalizer coupled to receive the corresponding composite signal, the known data signal, the power ratio signal and the at least one estimated communication channel characterizing signal, the equalizer for configuring at least one of its signal shaping characteristics to compensate for the at least one signal shaping characteristic of the communication channel, the configured equalizer for shaping the corresponding composite signal accordingly, and the equalizer having an output for providing at least one subsequent estimate of the unknown data signal.

In another aspect the present invention provides a multi-carrier transmitting system comprising:
  a data input for receiving an unknown data signal for transmission;
  a known data input for receiving a known data signal;
  a signal power ratio input for receiving a power ratio signal indicating a ratio for combining the unknown data signal and the known data signal; and
  a data combiner coupled to the data input, the known data input and the signal power ratio input, the data combiner for combining the unknown data signal and the known data signal in accordance with the power ratio signal to produce a composite output signal comprising discrete data signals, wherein each discrete data signal comprises at least a portion of the unknown data signal and at least a portion of the known data signal combined in accordance with the power ratio signal, the data combiner having an output adapted to provide the composite output signal to a multi-carrier transmitter, wherein the multi-carrier transmitter transmits a transmit signal on a communication channel, wherein the transmit signal includes the composite output signal.

In yet another aspect the present invention provides a multi-carrier receiving system comprising:
  a multi-carrier receiver for receiving a receive signal on a communication channel, where in the receive signal includes a composite signal, and the multi-carrier receiver having an output for providing the composite signal, wherein the composite signal comprises discrete data signals, and wherein each discrete data signal comprises at least a portion of an unknown data signal and at least a portion of a known data signal combined in accordance with a signal power ratio signal, the composite signal being shaped by at least one signal shaping characteristic of the communication channel;
  a channel estimator having a known data input for receiving the known data signal, an input coupled to receive the composite signal, an input coupled to receive the power ratio signal, and an input for receiving at least one estimate of the unknown data signal, the channel estimator for estimating the at least one signal shaping characteristic of the communication channel from at least the composite signal, the at least the portion of the known data signal of at least some of the discrete data signals, the power ratio signal and the at least one estimate of the unknown data signal, and the channel estimator having an output for providing at least one estimated communication channel characterising signal; and an equalizer coupled to receive the composite signal, the known data signal, the power ratio signal and the at least one estimated communication channel characterizing signal, the equalizer for configuring at least one of its signal shaping characteristics to compensate for the at least one signal shaping characteristic of the communication channel, the configured equalizer for shaping the composite signal accordingly, and the equalizer having an output for providing at least one subsequent estimate of the unknown data signal.

In still another aspect the present invention provides a method for determining received data in a multi-carrier communication system, wherein a received signal includes a composite signal received on a communication channel having transmission characteristics, wherein the composite signal comprises a plurality of discrete data signals spaced in time and frequency, and wherein each discrete data signal comprises a data portion and a pilot portion, wherein the data portion comprises one of a predetermined group of symbols, the method comprising the steps of:

a) defining a set of the plurality of discrete data signals;

b) setting a predetermined number of iterations;

c) receiving the composite signal on the communication channel;

d) selecting one of the plurality of discrete data signals to be estimated;

e) selecting a group of the plurality of discrete data signals, wherein each discrete data signal of the group of the plurality of discrete data signals is relevant to determining the one of the plurality of data signals;

f) normalising the group of the plurality of discrete data signals using at least the pilot portion of the one of the plurality of discrete data signals;

g) estimating the transmission characteristics of the communication channel using the normalised group of the plurality of discrete data signals in step (f); and h) estimating the data portion of the one of the plurality of discrete data signals using the communication channel having the transmission characteristics estimated in step(g) and at least the pilot portion of the one of the plurality of discrete data signals.

BRIEF DESCRIPTION OF THE DRAWINGS

An embodiment of the present invention will now be more fully described, by way of example, with reference to the drawings of which.

DETAIL DESCRIPTION OF THE DRAWINGS

The present invention combines the advantages of the PSAM and the blind schemes to produce a scheme where data and pilot symbols are combined prior to transmission, and separated when received at a receiver. In addition, separation of the pilot symbols at the receiver is accomplished by treating the data as noise and applying an iterative process to detect the data symbols. An embodiment of the present invention will now be described.

Figure 1:
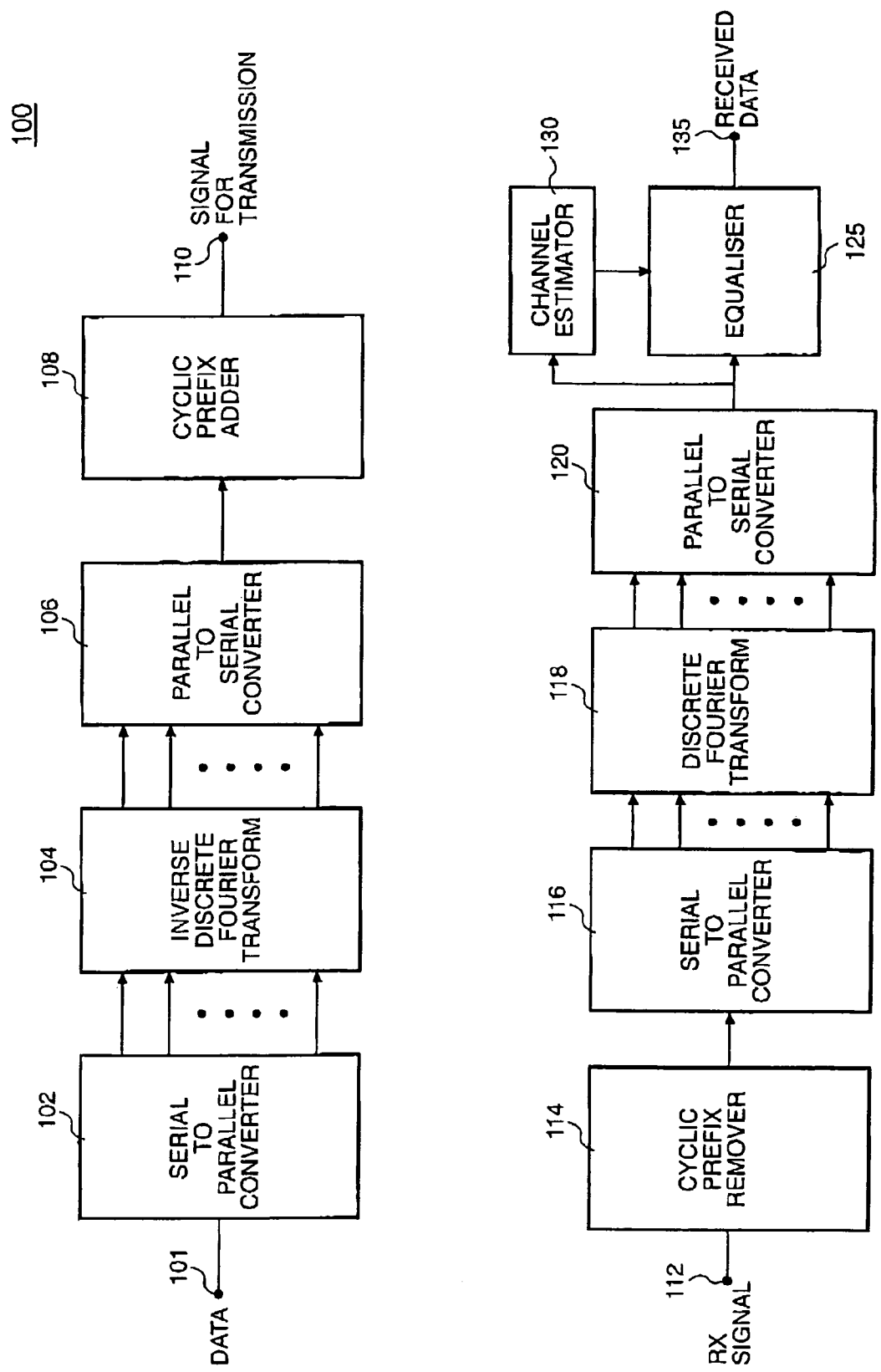
FIG. 1 shows a prior art communication system.
Figure 2:
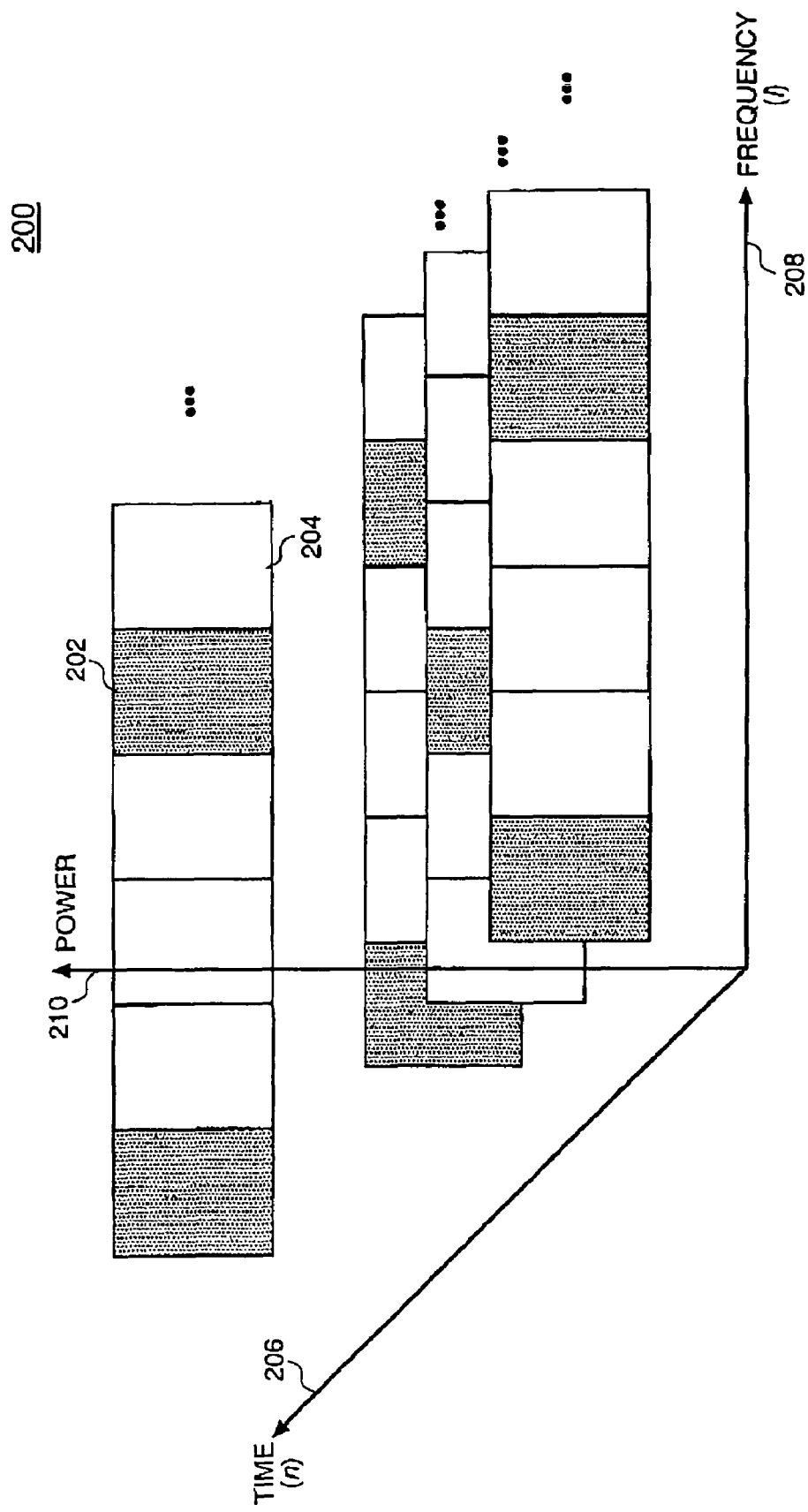
FIG. 2 shows a graphical representation of data and pilot symbols communicated on a communication channel of the communication system in FIG. 1.
Figure 3:
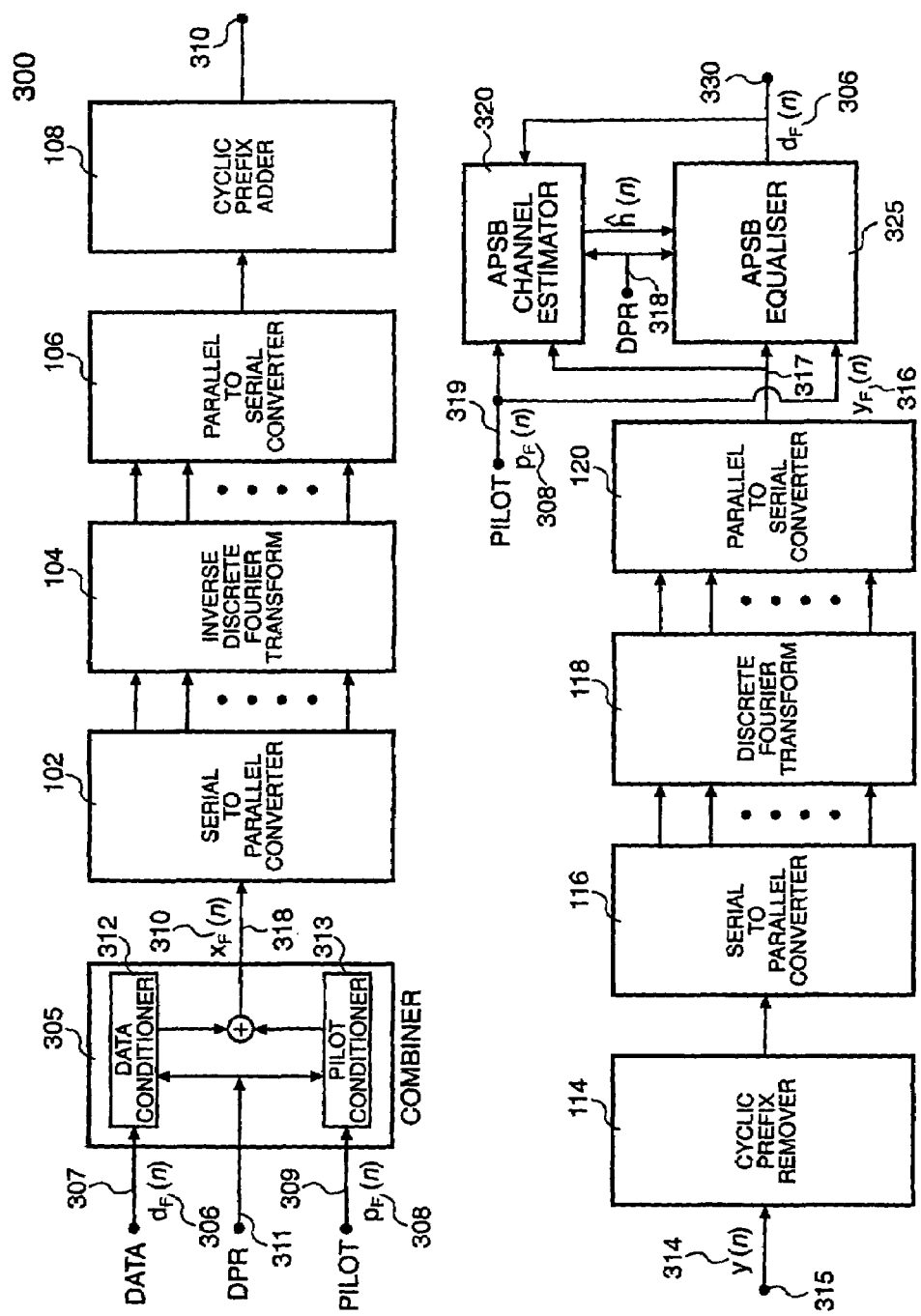
FIG. 3 shows a communication system in accordance with the present invention.

In FIG. 3 a communication system 300 that communicates data using an added pilot semi-blind (APSB) scheme, in accordance with the present invention, comprises a combiner 305 having a data input 307 for receiving a data signal 306, a pilot input 309 for receiving a pilot signal 308, and an input 311 for receiving a data-to-pilot power ratio (DPR) signal. The data signal 306 comprises a series of data symbols while the pilot signal comprises a series of pilot symbols. The DPR signal includes information on power levels of the data signal 306 and the pilot signal 308 that are to be combined.

The combiner 305 includes a data conditioner 312 that receives the data signal 306 and the DPR signal and provides a conditioned data signal having a power level as indicated by the DPR signal. Similarly, the combiner 305 includes a pilot conditioner 313 that receives the pilot signal 308 and the DPR signal, and provides a conditioned pilot signal having a power level as indicated by the DPR signal.

The combiner 305 also includes an adder 314 for combining the conditioned data signal from the data signal conditioner 312 and the conditioned pilot signal from the pilot signal conditioner 313, by combining a series of conditioned data symbols and a series of conditioned pilot symbols, and providing data-pilot signals 310 via an output 318 of the combiner 305. The data-pilot signals 310 comprises a series of discrete data signals, where each discrete data signal has a data portion and a pilot data portion, and where the power levels of the data portion and the pilot portion are in accordance with the DPR signal. The data portion represents at least one data symbol.

The data-pilot signals 310 are then processed, in sequence, by the serial to parallel converter 102, the IFFT 104, the parallel to serial converter 106, the cyclic prefix adder 108, as described earlier, and a transmit data-pilot signal from output 310 is transmitted on a communication channel.

A corresponding receive data-pilot signal 314 received from the communication channel at input 315, is processed sequentially by the cyclic prefix remover 114, the serial to parallel converter 116, the discrete Fourier transform 118 and the parallel to serial converter 120, as described earlier. An output data-pilot signal 316 from output 317 of the parallel to serial converter 120 is then provided to an APSB equalizer 325 and to an APSB channel estimator 320. The APSB channel estimator 320 and the APSB channel equaliser 325, each include an input 319 for receiving the pilot signal 308, and each include an input 318 for receiving the DPR signal. The pilot signal 308 and the DPR signal may be stored in a memory (not shown). The APSB equaliser 325 operates with the APSB channel estimator 320 to determine the originally transmitted data 306 from the data-pilot signal 316 using the pilot signal 308 and the DPR signal, and provides the originally transmitted data 306 via output 330 of the APSB equaliser 325. This is accomplished with an iterative process where a channel estimate ĥ(n) is made by the APSB channel estimator 320, and a data estimate is then made using the previously obtained channel estimate and provided via output 330. The output 330 is coupled to the APSB channel estimator 320 to provide the channel estimate for a subsequent iteration of channel estimation and data estimation. When a predetermined number of iterations have been performed, the originally transmitted data 306 is determined and provided via output 330 of the APSB equaliser 325.

Figure 4:
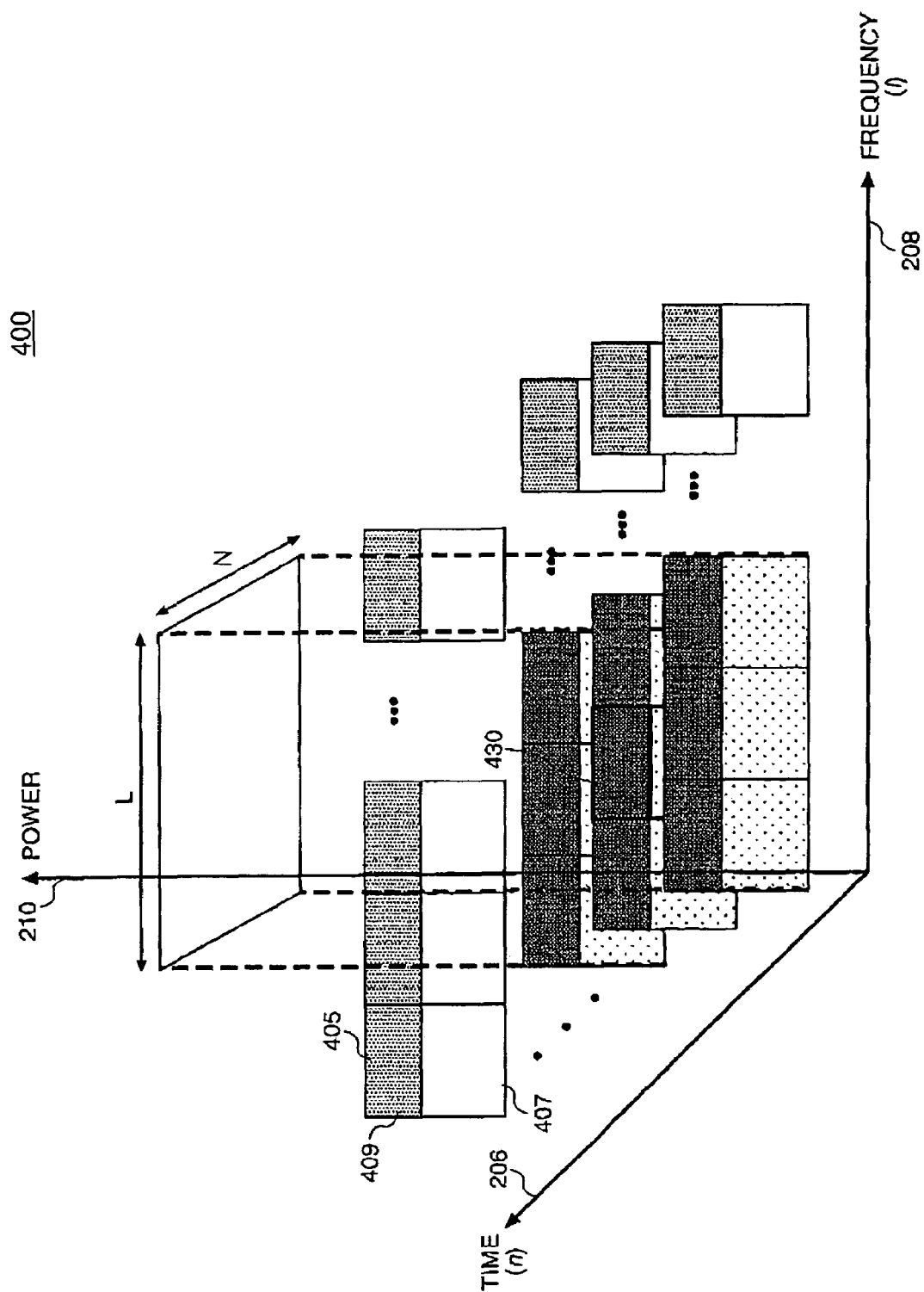
FIG. 4 shows a graphical representation of data and pilot symbols communication on a communication channel of the communication system in FIG. 3.

With additional reference to FIG. 4, which shows the APSB scheme graphically, symbols of the data-pilot signal 317 are shown as discrete signals 405 in the three dimensional grid across time 206 and frequency 208 axes, and where the vertical axis represents transmission power 210. Each discrete signal 405 comprises two portions, a data portion 407 and a pilot portion 409. The proportions are defined by the DPR signal, which is, as defined earlier, the ratio of the data signal power to the pilot signal power. There is an optimum DPR where the performance of the communication system 300 would be best.

In accordance with the present invention as described, the pilot is transmitted along with the data simultaneously and in the same frequency band, therefore transmission of the pilot advantageously does not consume bandwidth of the communication channel.

The data-pilot signal 314 received from the communication channel contains information about the communication channel, and the pilot portion of the data-pilot signal is known. Then, by treating the data portion as noise, an initial estimation of the communication channel can be determined, and a data estimate obtained, with the initial estimation of the communication channel, using a least squares approach. With partial knowledge of the characteristics of the communication channel via the channel estimates and the data estimates, further iterations of channel and data estimation are performed, thereby improving the accuracy of the estimation and allowing an accurate estimate of the transmitted data to be made after a predetermined number of iterations.

Figure 5:
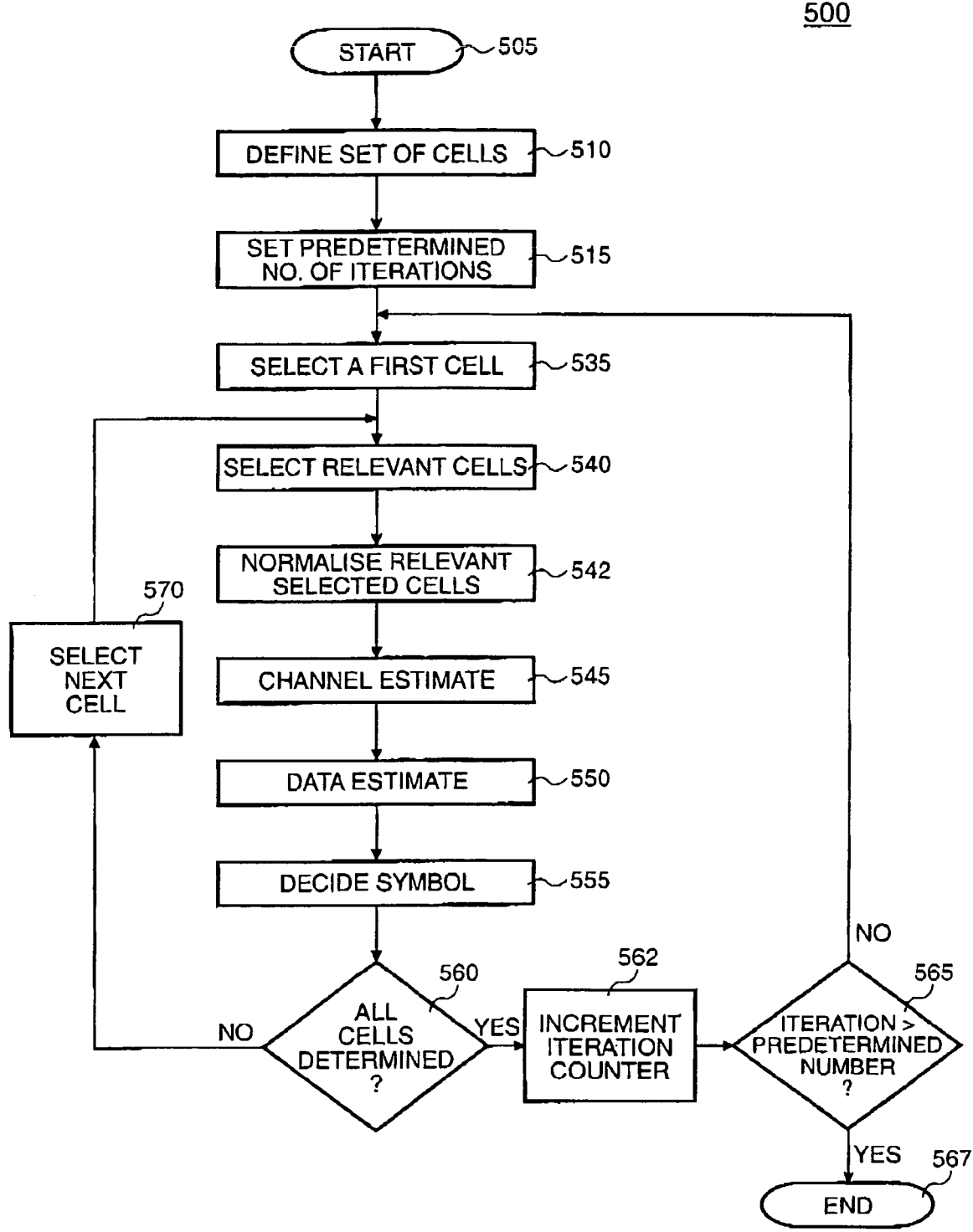
FIG. 5 shows a flow chart diagram of a process in a receiver of the communication system in FIG. 3.

With additional reference to FIG. 5, a process 500 for estimating the transmitted data starts 505 with selecting 510 a set of cells $S_D$ from the received set of data-pilot cells S. Next the predetermined number of iterations is set 515, and a first cell, for example cell 430 at (n,l) is selected 535. Subsequently, cells relevant to the estimation of the cell 430 are selected 540. Here, the selected cells are the eight cells adjacent to the cell 430 as typically the closest surrounding cells are selected. Using the time 206 n and frequency 208 l axes as references, the cell 430 is identified as cell (n,l) and the relevant selected cells as $S^P$ (n,l). All the relevant selected cells $S^P$ (n,l) are then normalised 542, for example by dividing the selected relevant cells by the pilot symbol portion 409 to allow a suitable channel estimate to be made. An initial channel estimate 545 is then made using a 2-D Wiener filter, where the data portions 407 of the selected relevant cells are treated as noise, and the result is an estimate of the communication channel at (n, l). Subsequently, a data estimate 550 is made using the least squares approach, and a decision 555 is made as to which symbol was transmitted. The decision step 555 may involve processes such as interleaving and coding before a decision is made.

A determination 560 is then made as to whether all the cells in the set S have been determined. When not all the cells in the set S have been determined, then the next cell of the set S of cells is selected 570, and the process 500 returns to step 540 of selecting relevant cells to the newly selected cell. The looping back through step 570 continues until all the cells in the set S have been determined. When all the cells in the set S have been determined, the determination at step 560 is true, a counter (not shown) indicating the number of iterations i is incremented 562, and a determination 565 is made as to whether the number of iteration i have reached the predetermined number of iterations set in step 515. When the number of iterations i has reached the predetermined number of iterations set in step 515, the process 500 ends 567. However, when the number of iterations i has not reached the predetermined number, the process 500 returns to step 535 and repeats as described above.

Returning now to FIG. 3 a functional description of the communication system 300 now follows. The rules for notation that are employed are:

in the time domain, signals at index (n, l) are written as h(n, l), vectors as h(n), and matrices as H(n);

in the frequency domain a subscript F is added (e.g. $h_F$(n, l), $h_F$(n), $H_F$(n)); and sub-vectors/matrices are capped with a tilde e.g. $\tilde{h}$ or $\tilde{H}$, and estimated entities with a hat e.g. $\hat{h}$;

superscripts $^T$, $^H$ and * denote the operations matrix transpose, Hermitian and conjugation, respectively, and E denotes expectation; and elements of vectors/matrices are denoted as $[h]_i/[H]_{ij}$.

The elementary sample period of an OFDM system model is T, the number of subcarriers is L, the number of cyclic prefix samples is D, and the maximum number of channel response samples is B+1($\leq$D)

while the total number of samples in one OFDM symbol is

P=L+D and, the OFDM symbol period is defined as $T_s$=PT.

The complex baseband representation of the communication channel 605, particularly a mobile wireless communication channel, impulse response at time t is described by $$h(t, \tau) = \sum_l \gamma_l(t)\delta(\tau - \tau_l(t)) \quad (1)$$

where $\tau_l(t)$ and $\gamma_l(t)$ are the delay and complex amplitude of the $l^{th}$ path, respectively. The power delay profile of the channel is defined as $$p(\tau)=E[h(t, \tau)h^*(t, \tau)] \quad (2)$$

Assuming an exponentially decaying power delay profile with $$p(\tau)=A\exp(-\tau/\tau_{rms})$$

where $\tau_{rms}$ is a parameter of the channel known as the root mean squared delay spread, and A is a normalizing constant. The normalized $\tau_{rms}$ is given as $\tau_{rms}$/T.

Due to the relative mobility of the transmitter and receiver, a maximum Doppler spread, $f_D$, will occur in the received signal. This is accounted for with a time-variant channel where a high $f_D$ implies a fast varying channel. The normalized maximum Doppler spread is defined as $f_D T_s$, based on the assumption that the channel coefficients are time invariant over each OFDM symbol period $T_s$.

A function which is useful for analysis in OFDM is the time-variant transfer function obtained from the Fourier transform of equation (1) above, with respect to delay τ, which produces the equation below.

$$h_F(t, f) = \int_{-\infty}^{\infty} h(t, \tau) \exp(-j2\pi f\tau) d\tau \qquad (3)$$

Assuming a wide sense stationary uncorrelated scattering (WSSUS), and a Rayleigh fading channel with Jakes' spectrum, the autocorrelation of the channel is separable in time t, and frequency f, and can be written as follows.

$$r_{h_F h_F}(t, t'; f, f') = E[h_F(t, f) h_F^*(t', f')] \qquad (4A)$$
$$= r_t(\Delta t) r_f(\Delta f)$$

where Δt=t−t'; and Δf=f−f'. We have $$r_f(\Delta f) = \frac{1 - \exp(-DT(1/\tau_{rms} + j2\pi\Delta f))}{(1 - \exp(-DT/\tau_{rms}))(1 + j2\pi\tau_{rms})} \qquad (4B)$$
$$\approx \frac{1}{1 + j2\Delta f \tau_{rms}}$$

assuming $[(D)/(\tau_{rms}/T)] >> 1$, and $$r_t(\Delta t) = J_0(2\pi F_D \Delta t) \qquad (4C)$$

with $J_0(\cdot)$ being the zeroth order Bessel function of the first kind.

The discrete channel mode of a communication channel of order B(<D) can be described as h(n, l)=h(t=nT$_r$, τ=lT), assuming that $\tau_k(t)$ is uniformly spaced at intervals of T and that p(τ)=0 for τ>τ$_{max}$=BT and represented as a vector at time n as $$h(n) = [h(n, 0) \ldots h(n, L-1)]^T \qquad (5)$$
$$= [h(n, 0) \ldots h(n, B) 0 \ldots 0]^T \in C^{L \times 1}$$

where C is a complex number.

The channel coefficients in the frequency domain are obtained in a similar way to equation (2), but in discrete time as $$h_F(n) = \sqrt{L} F h(n) = [h_F(n, 0) \ldots h_F(n, L-1)]^T \qquad (6)$$

where F is the L X L unitary discrete Fourier transform (DFT) matrix with $[F]_{n,l} = \exp(-2\pi nl/L)/\sqrt{L}$, and $F^H$ is the corresponding inverse DFT (IDFT) matrix. The auto-correlation of the discrete channel, $r_{h_F h_F}(n, l)$, can be obtained from the equations (4A), (4B) and (4C) by replacing Δf=1/(LT) and Δt=nT$_S$.

The received OFDM signal may be considered a digital signal in a 2-D cell structure with indices (n,l)∈S.

where S={(n,l):0≤n≤N−1, 0≤l≤L−1}, and where N is the total number of cells in the time direction, n, and L is the number of sub-carriers as defined earlier.

A model for a 2-D Wiener filter will now be described, as such a filter is used to form estimates from sampled signals at the receiver. Estimates will be obtained at index (n,l)∈S$_D$ from the sampled signals at indices (n',l')∈D$_P$$^{(n,l)}$, where S$_D$ and S$_P$$^{(n,l)}$ are subsets of S, and where $S_P = \cup_{n,l} S_P^{(n,l)}$. The definitions of S$_D$, S$_P$ and S$_P$$^{(n,l)}$ will be provided later.

In a 2-D wide sense stationary (WSS) stochastic process $\check{h}_F(n,l)$ which contains information of the desired signal h$_F$(n,l) and is corrupted by correlated noise h$_F$(n,l)v$_F$(n,l) and additive white Gaussian noise (AWGN), u$_F$(n,l), as follows:

$$\check{h}_F(n,l) = h_F(n,l) + h_F(n,l) v_F(n,l) + u_F(n,l) \qquad (7)$$

The notation h$_F$(n,l) and u$_F$(n,l) indicate that the channel frequency response is estimated from its noisy samples. It is assumed that v$_F$(n,l) and u$_F$(n,l) are white, and that h$_F$(n,l), v$_F$(n,l) and u$_F$(n,l) are mutually un-correlated, and zero mean stochastic processes. In the prior art PSAM scheme, the correlated noise component is absent, in contrast, for the APSB scheme of the present invention, as described, the correlated noise component is advantageously reduced through successive iterative measures.

For the 2-D Wiener filter, the estimator for h$_F$(n,l) is given as:

$$\overline{h}_F(n, l) = \sum_{\{n',l'\} \in S_P^{(n,l)}} w(n, l; n', l') \check{h}_F(n', l'), \quad \forall (n, l) \in S_D \qquad (8)$$

where w(n,l;n'l') is the weight applied on $\check{h}_F(n',l')$ to estimate h$_F$(n,l).

Based on the assumption that a total of $\Delta_N$ and $\Delta_L$ pilots are used in the n and l direction, respectively, for each estimation of h$_F$(n,l), a vector $\check{h}(n,l) \in C^{\Delta_S N_{\Delta s} L \times 1}$ is performed by stacking the elements from $\check{h}_F(n',l')$, ∀(n',l')∈ $S_P^{(n,l)}$, and a vector w (n,l)∈$C^{\Delta_S N_{\Delta s} L \times 1}$ is formed by stacking the conjugate elements of w(n,l;n'l'). Equation (8) can be re-written as follows.

$$\overline{h}_F(n,l) = w^H(n,l) \check{h}_F(n,l) \qquad (9)$$

To minimize the difference h$_F$(n,l)−$\overline{h}$(n,l) in the mean square sense and obtain the optimum tap-weight vector, the orthogonally principle is now applied to equation (9), resulting in the equation below.

$$E[(h_F(n,l) - \overline{h}_F(n,l)) \cdot h_F^*(n'',l'')] = 0, \forall\{n'',l''\} \in S_P^{(n,l)} \qquad (10)$$

Substituting equation (8) into equation (10), the Wiener-Hopf equation, with optimum tap weights w$_0$(n,l;n',l'), is obtained as provided below.

$$\sum_{\{n',l'\} \in S_P^{(n,l)}} w_0(n,l;n',l') E[\check{h}_F(n',l') \check{h}_F^*(n'',l'')] = E[h_F(n,l) h_F^*(n'',l'')] \qquad (11)$$

Defining the cross-correlation of h$_F$(n,l) and $\check{h}_F$(n,l) and the autocorrelation of $\check{h}_F$(n,l), respectively as $$r_{\check{h}_F h_F}(n-n'', l-l'') = E[\check{h}_F(n,l) h_F^*(n'',l'')] \qquad (12)$$

$$r_{\check{h}_F \check{h}_F}(n'-n'', l'-l'') = E[\check{h}_F(n',l') h_F^*(n'',l'')] \qquad (13)$$

Letting $r_{\check{h}_F h_F}(n,l) = E[\check{h}_F(n,l) h_F^*(n,l)] \in C^{66s\ N\Delta s\ L \times 1}$ be the cross-correlation vector and $R_{\check{h}_F \check{h}_F}(n,l) = E[\check{h}_F(n,l) \check{h}_F^H(n,l)] \in C^{\Delta s\ N\Delta s\ L \times \Delta s\ N\Delta s\ L}$ be the autocorrelation matrix $\check{h}_F$(n,l) formed from the elements of equations (12) and (13), respectively. Therefore, the Wiener-Hopf equation can be re-written in matrix notation as $$w_0(n,l) = R_{\check{h}_F \check{h}_F}^{-1} r_{\check{h}_F h_F}(n,l) \qquad (14)$$

Assuming that h$_F$(n,l), v(n,l) and u(n,l) are mutually un-correlated and wide-sense stationary white stochastic processes, using the definition provided by equation (7), and letting $\Delta n$ and $\Delta l$ be the discrete time and frequency difference indices, respectively, equations (12) and (13) can be written as follows.

$$r_{\tilde{h}_F \tilde{h}_F}(\Delta n, \Delta l) = r_{h_F h_F}(\Delta n, \Delta l)$$

$$r_{\tilde{h}_F \tilde{h}_F}(\Delta n, \Delta l) = r_{h_F h_F}(\Delta n, \Delta l) + \qquad (16)$$

$$r_{h_F h_F}(\Delta n, \Delta l) \times$$

$$r_{v_F v_F}(\Delta n, \Delta l) +$$

$$r_{v_F v_F}(\Delta n, \Delta l)$$

$$= \begin{cases} r_{h_F h_F}(\Delta n, \Delta l) + \sigma_h^2 \sigma_v^2 + \sigma_u^2 & \text{for } \Delta n, \Delta l = 0 \\ r_{h_F h_F}(\Delta n, \Delta l) & \text{otherwise} \end{cases}$$

where $r_{h_F h_F}(\Delta n, \Delta l)$ is the autocorrelation matrix $h_F$. $R_{\tilde{h}_F \tilde{h}_F}$ and $r_{\tilde{h}_F h_F}(n,l)$ can be simplified as $$R_{\tilde{h}_F \tilde{h}_F} = R_{h_F h_F} + diag(R_{h_F h_F}) \sigma_v^2 + \sigma_u^2 I$$

$$= R_{h_F h_F} + (\sigma_h^2 \sigma_v^2 + \sigma_u^2) I$$

$$r_{\tilde{h}_F h_F}(n,l) = r_{h_F h_F}(n,l) \qquad (18)$$

And, where $R_{h_F h_F}$ is the NL by NL autocorrelation matrix of $h_F$, then $R_{h_F h_F}$ can be obtained from equation (4). If $R_{h_F h_F}$, $\sigma_v^2$ and $\sigma_u^2$ are known, the optimum weight is $$w_0(n,l) = [R_{h_F h_F} + (\sigma_h^2 \sigma_v^2 + \sigma_u^2) I]^{-1} r_{h_F h_F}(n,l) \qquad (19)$$

The mean square error (MSE) can then be obtained as $$E[|h_F(n,l) - \hat{h}_F(n,l)|^2] \forall (n,l) \in S_D \qquad (20)$$

The minimum MSE (MMSE) at index (n,l) is then obtained by substituting equation (9) into equation (20), and using the optimum weight factor in equation (19), $$MMSE(n,l) = \sigma_h^2 - w_0^H(n,l) r_{h_F h_F}(n,l) \qquad (21)$$

For simplicity, $\sigma_h^2 = 1$ for all subsequent equations.

Now letting the transmitted data in the frequency domain be $d_F(n,l)$, $\forall (n,l) \in S_D$, where n is the discrete time index and l the discrete frequency index. In an OFDM system, n refers to the OFDM block index, while l refers to the sub-carrier index, and pilots are denoted as $p_F(n,l)$, $\forall (n,l) \in S_P$. It is assumed that $p_F(n,l)$ is deterministic and selected from a fixed set of alphabets, while $d_F(n,l)$, the data is a zero mean stochastic process. The variance of $p_F(n,l)$ is denoted as $\epsilon^2 \sigma_d^2$, and in practical implementations $\epsilon^2 \ll 1$.

In accordance with the present invention, as described herein, pilot signals and data signals are added together and co-exist at all time, n, and frequency points, l, in order to conserve bandwidth, that is, $S_D = S_P = S$. The signal after the data signal and the pilot signal are combined is defined below.

$$x_F(n,l) = d_F(n,l) + p_J-(n,l), \forall (n,l) \in S \qquad (22)$$

and $\sigma_x^2 = (1+\epsilon^2)\sigma_d^2$. Other definitions follow.

Data-to-Pilot Power Ratio (DPR)=$\sigma_d^2/(\epsilon^2 \sigma_d^2)=1/\epsilon^2$ Signal-to-Pilot Power Ratio (SPR)=$\sigma_x^2/(\epsilon^2 \sigma_d^2)=1+1/\epsilon^2=1+DPR$ Assuming that the orthogonality of the OFDM system 600 is maintained, the signal after OFDM demodulation is $$y_F(n,l) = h_F(n,l) x_F(n,l) + b_F(n,l) \qquad (23)$$

$$= h_F(n,l)(d_F(n,l) + p_F(n,l)) + b_F(n,l)$$

where $b_F(n,l)$ is an additive Gaussian noise (AWGN) stochastic process.

In accordance with the present invention, as described herein, channel-data estimation from the received signal $y_F(n,l)$ is performed in an iterative manner. For ease of description, the first iteration and subsequent iterations will be described separately.

FIRST ITERATION

Channel estimator 320 is a 2-D Wiener filter, as characterized earlier, estimates the channel response. First, the received signal $y_F(n,l)$ in equation (23) is normalized in the first iteration, thus.

$$\tilde{h}_F(n,l) = y_F(n,l)/p_F(n,l) \qquad (24)$$

$$= h_F(n,l) + h_F(n,l) d_F(n,l)/p_F(n,l) +$$

$$b_F(n,l)/p_F(n,l)$$

$$= h_F(n,l) + h_F(n,l) v_{F1}(n,l) + u_{F1}(n,l)$$

where $v_{F1}(n,l) = d_F(n,l)/p_F(n,l)$ is a data-dependent noise introduced due to the addition of the pilots to the data, and $u_{F1}(n,l) = b_F(n,l)/p_F(n,l)$ is AWGN. The subscript "1" indicates that the notation is specific to the first iteration. Similar use of subscript "i" will be employed for the $i^{th}$ iteration.

Assuming that the pilots, $p_F(n,l)$, are selected from a set of constant modulus symbols, we obtain $$\sigma_{v1}^2 = E\left[\left|\frac{d_F(n,l)}{p_F(n,l)}\right|^2\right] = \frac{\sigma_d^2}{\epsilon^2 \sigma_d^2} = DPR \qquad (25)$$

and similarly $$\sigma_{u1}^2 = \frac{\sigma_b^2}{\epsilon^2 \sigma_d^2} = \frac{1+\epsilon^2}{\epsilon^2} \frac{\sigma_b^2}{\sigma_x^2} = \frac{SPR}{SNR} \qquad (26)$$

where, as defined earlier, SPR=$(1+\epsilon^2)/\epsilon^2$, and SNR=$\sigma_x^2/\sigma_b^2$.

Equation (24) is in a similar form as equation (7) and the optimum tap weights can be obtained in a similar form as in equation (14) using time $\Delta_N$ and frequency $\Delta_L$ sampled signals. In this case, the autocorrelation matrix $R_{\tilde{h}_F \tilde{h}_F}(n,l)$ is usually dependent of (n,l).

Figure 6:
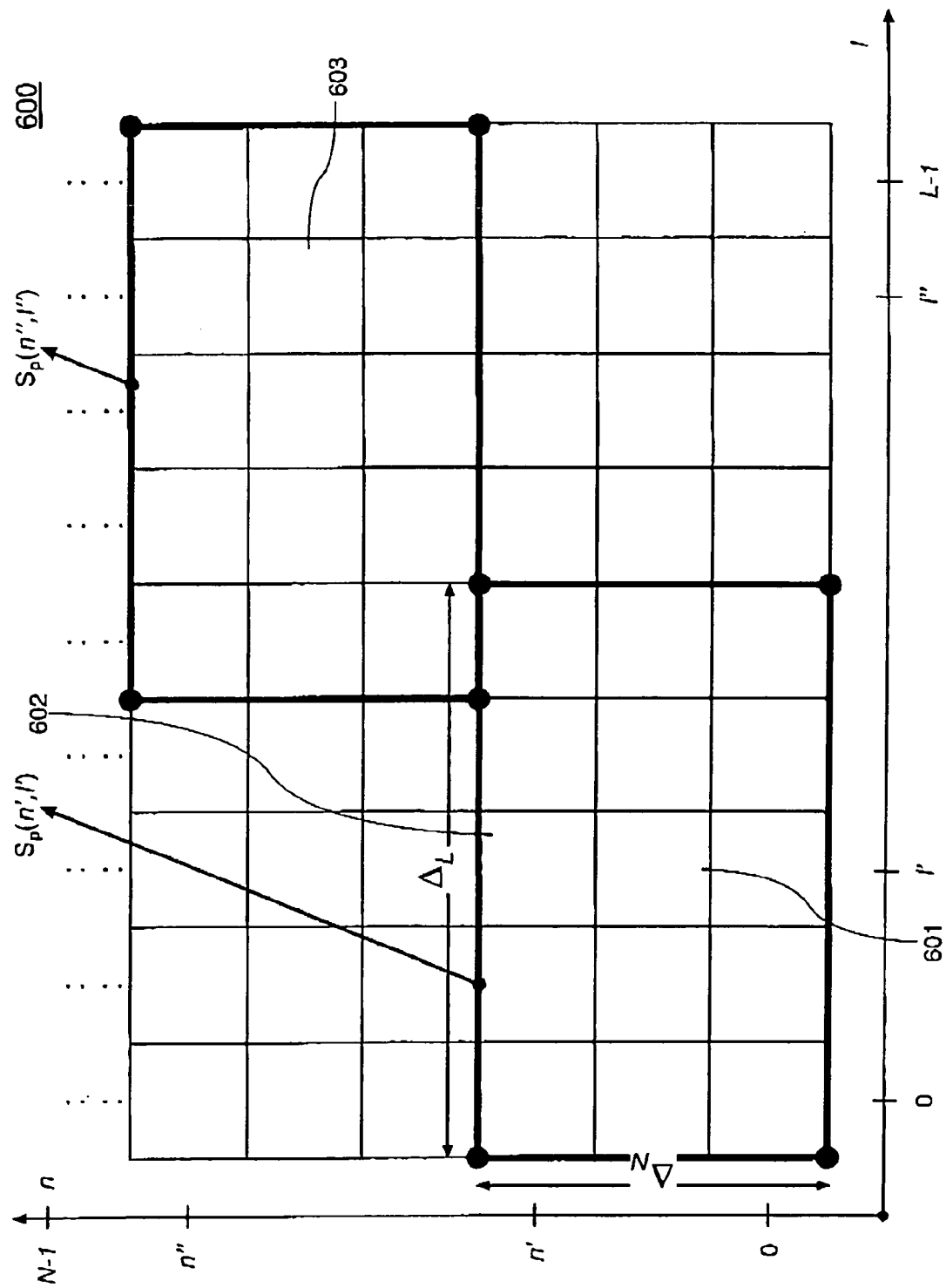
FIG. 6 shows a graphical representation of the APSB scheme in the communication system in FIG. 3.

FIG. 6 shows a graphical representation in the time/frequency domain, and $S_P^{(n,l)}$ is selected such that (n,l) is in the center of $S_P^{(n,l)}$. The set of indices encompassed by $S^{p(n,l)}$ will change, and may be visualized as a sliding window, as (n,l) changes. The relative index of (n,l) and $S^{p(n,l)}$ however, will not change. Assuming wide sense stationarity, $R_{\tilde{h}_F \tilde{h}_F}(n,l)$ will also not change. Next, for example, the cross-correlation vector $r_{\tilde{h}_F h_F}(n,l)$ when estimating index 601 and 602 would be the same. When (n,l) is near to the boundary of $S_P$, such as when estimating index 603, the relative indices of (n,l) and $S_P^{(n,l)}$ would be different. Thus, $r_{\tilde{h}_F h_F}(n,l)$ would be different in this case.

Now, the MMSE estimator for the first iteration follows.

$$\hat{h}_{FI}(n,l) = w_{0,1}{}^H(n,l)\, \check{h}_{FI}(n,l) \qquad (27)$$

Thus, the first estimate of $x_F(n,l)$ is $$\tilde{x}_{FI}(n,l) = \frac{y_F(n,l)}{\hat{h}_{FI}(n,l)} \qquad (28)$$

Then, in view of equation (22), the estimate for $d_F(n,l)$ is obtained as $$\begin{aligned}\tilde{d}_{FI}(n,l) &= \tilde{x}_{FI}(n,l) - p_F(n,l) \qquad (29)\\ &= \frac{y_F(n,l)}{\hat{h}_{FI}(n,l)} - p_F(n,l)\\ &= \frac{h_F(n,l)(d_F(n,l) + p_F(n,l)) + b_F(n,l)}{\hat{h}_{FI}(n,l)} - p_F(n,l)\end{aligned}$$

If the channel estimation is perfect, i.e., $\hat{h}_{FI}(n,l)=h_F(n,l)$, then equation (26) becomes $$\tilde{d}_{FI}(n,l) = d_F(n,l) + b_F(n,l)/h_F(n,l) \qquad (30)$$

Then, a decision device or slicer, as is known in the art, is used on $\tilde{d}_{FI}(n,l)$ to obtain an estimate $\hat{d}_{FI}(n,l)$ of $d_F(n,l)$.

SUBSEQUENT ITERATIONS

For the second iteration, the normalization is carried out using $\hat{d}_{F1}(n,l)+p_F(n,l)$.

The normalization tries to remove the data-dependent noise $v_{F1}(n,l)$ that appears in the first iteration as characterized in equation (24). The normalization for the second iteration is carried out as follows:

$$\begin{aligned}\check{h}_{F2}(n,l) &= \frac{y_F(n,l)}{\hat{d}_{FI}(n,l) + p_F(n,l)} \qquad (31)\\ &= \frac{h_F(n,l)(d_F(n,l) + p_F(n,l)) - b_F(n,l)}{\hat{d}_{FI}(n,l) + p_F(n,l)}\end{aligned}$$

Making the substitution $\hat{d}_{FI}(n,l)=d_F(n,l)$ which is a good approximation when the probability of symbol error is small, equation (31) becomes $$\begin{aligned}\check{h}_{F2}(n,l) &= h_F(n,l) + \frac{b_F(n,l)}{\hat{d}_{FI}(n,l) + p_F(n,l)} \qquad (32)\\ &= h_F(n,l) + u_{F2}(n,l)\\ u_{F2}(n,l) &= \frac{b_F(n,l)}{\left(\hat{d}_{FI}(n,l) + p_F(n,l)\right)}\end{aligned}$$

Equation (32) has the form of equation (7) with $\sigma_{v2}^2=0$ since $v_{F2}(n,l)=0$. Then based on the assumption that $\epsilon^2 \ll 1$, $d_F(n,l)$ is modulated by quadrature phase shift keying (QPSK) and $p_F(n,l)\in\{\epsilon\sigma_d(\pm 1 \pm j)/\sqrt{2}\}$, a QPSK constellation $|d_F(n,l)+p^r(n,l)|^2$ can have four possible values, each being equally likely to occur: $\sigma_d^2(1+j)+\epsilon(\pm 1 \pm j)|^2/2$. It should be noted that only the first quadrant of the QPSK signal constellation has been considered due to its 2-D symmetry. Hence, the required variance reduces to $$\begin{aligned}\sigma_{u2}^2 &= \sigma_b^2 E\left[\left|\hat{d}_{FI}(n,l) + p_F(n,l)\right|^{-2}\right] \qquad (33)\\ &= \sigma_b^2 \frac{1+\varepsilon^4}{(1-\varepsilon^2)^2(1+\varepsilon^2)} \sigma_d^{-2}\\ &= (1+\varepsilon^4) \frac{1}{(1-2\varepsilon^2+\varepsilon^4)} \frac{\sigma_b^2}{(1+\varepsilon^2)\sigma_d^2}\\ &= (1+\varepsilon^4)(1+2\varepsilon^2+\ldots)SNR^{-1}\\ &\approx (1+2\varepsilon^2)SNR^{-1}\end{aligned}$$

This approximation can be made when $\epsilon^2 \ll a$.

The 2-D Wiener filtering is applied according in equation (9) and (14) by setting by setting $\sigma_v^2 = \sigma_{v2}^2 = 0$ (i.e. there is no correlated noise component) and $\sigma_u^2 = \sigma_{u2}^2$. Then the channel estimator is $$\hat{h}_{F2}(n,l) = w_{0,2}{}^H(n,l)\, \check{h}_{F2}(n,l) \qquad (34)$$

Finally, the estimate $\hat{d}_{F2}(n,l)$ is obtained by following the steps as in equations (28) and (29).

The subsequent iterations can be extended from the second iteration. However, the assumption $\hat{d}_{F2}(n,l)=d_F(n,l)$ made in equation (32) will be more accurate in subsequent iterations and will therefore result in a better estimate for $\hat{h}_{F3}(n,l),\hat{h}_{F4}(n,l)$, etc. As more iterations are performed, the channel estimate converges to the actual channel response.

In the prior art PSAM scheme, for every one pilot cell, there are on average $(\delta_N \delta_L - 1)$ data cells. The effective average signal power after pilot insertion is $$\sigma_x^2 = \sigma_d^2 \left[\frac{\eta^2 + (\delta_L \delta_N - 1)}{\delta_L \delta_N}\right] \qquad (35)$$

where $\eta^2 \geq 1$ is the ratio of the power of the pilot to that of the data for PSAM scheme.

The signal-to-noise ratio (SNR) of the PSAM scheme can thus be expressed as $$SNR = 10\log_{10}(\sigma_x^2/\sigma_b^2) = SNR' + SNR_{loss}(dB) \qquad (36)$$

$SNR' = \sigma_d^2/\sigma_b^2$ is the SNR of the system without the presence of pilots, while $SNR_{loss}$ represents the additional SNR required to compensate for the loss of power which has been allocated to the pilot. Therefore, it follows from equations (35) and (36) that $$\begin{aligned}SNR_{loss} &= 10\log_{10}(\sigma_x^2/\sigma_d^2)\,dB \qquad (37)\\ &= 10\log_{10}\left(\frac{\eta^2 + (\delta_L \delta_N - 1)}{\delta_L \delta_N}\right)dB\end{aligned}$$

Since part of the bandwidth is used for pilot transmission, there is a reduction in the effective data rate. The percentage bandwidth loss is $$W_{loss} = \frac{1}{\delta_L \delta_N} \times 100\% \quad (38)$$

When power boosted pilots (i.e. η>1) are used, we note that $SNR_{loss}$>0 dB. The actual SNR would have to be adjusted according to equation (36) for proper comparison with other schemes. In the case when η=1, however, no additional power is incurred under the definition provided by equation (37). Regardless of the value of η, a bandwidth loss is still incurred as seen from equation (38).

For the APSB scheme, in accordance with the present invention, as described, the SNR is defined in a similar way as in equation (36), however with the APSB scheme $$SNR_{loss} = 10\log_{10}(\sigma_x^2/\sigma_d^2)\text{dB} \quad (39)$$
$$= 10\log_{10}\left(\frac{SPR}{SPR-1}\right)\text{dB}$$

In contrast to the prior art PSAM scheme, the APSB scheme $SNR_{loss}$ is always greater than 0 dB since ε>0. On the other hand, although the prior art PSAM scheme suffers from bandwidth loss, the APSB scheme advantageously has $W_{loss}$=0.

Both the prior art PSAM and the APSB schemes require sufficient OFDM symbols to be received before an optimum channel estimate can be obtained. Depending on the selection of the indices of the sampled signal, $S_P^{n,l}$, different processing delays would be incurred in order for an optimum estimate to be made When a non-causal 2-D Wiener filter is used, such that the index (n,l) is at the center of $S_P^{(n,l)}$, the processing delay is then $\delta_N(\Delta N-1)/2$ for the prior art PSAM scheme. For the APSB scheme, the processing delay is the same with $\delta_N$=1.

The results of simulations will now be presented. For the simulations, the common system parameters were set as L=32, D=8, B=7, $\tau_{rms}/T$=0.5, $\tau_{max}/T$=8 and SNR=20 dB. It was assumed that the SNR is known and that $\sigma_h^2$=1, and a QPSK signal constellation for the transmitted signal and the pilot signal was used. In addition, $S_P^{(n,l)}$ was selected such that the index (n,l) is in the center of the 2-D indices of $S_P^{(n,l)}$. This results in the best MSE performance. It is possible to estimate the channel at indices n≤($\Delta_N$−1)/2 or n≥N−($\Delta_N$+1)/2, and 1≤($\Delta_L$−1)/2 or l≥L−($\Delta_L$+1)/2 in such a manner where a centered-interpolation is carried out. For the other indices, an off-centered interpolation is required to estimate the channel, giving some degradation of the MSE.

Figure 7:
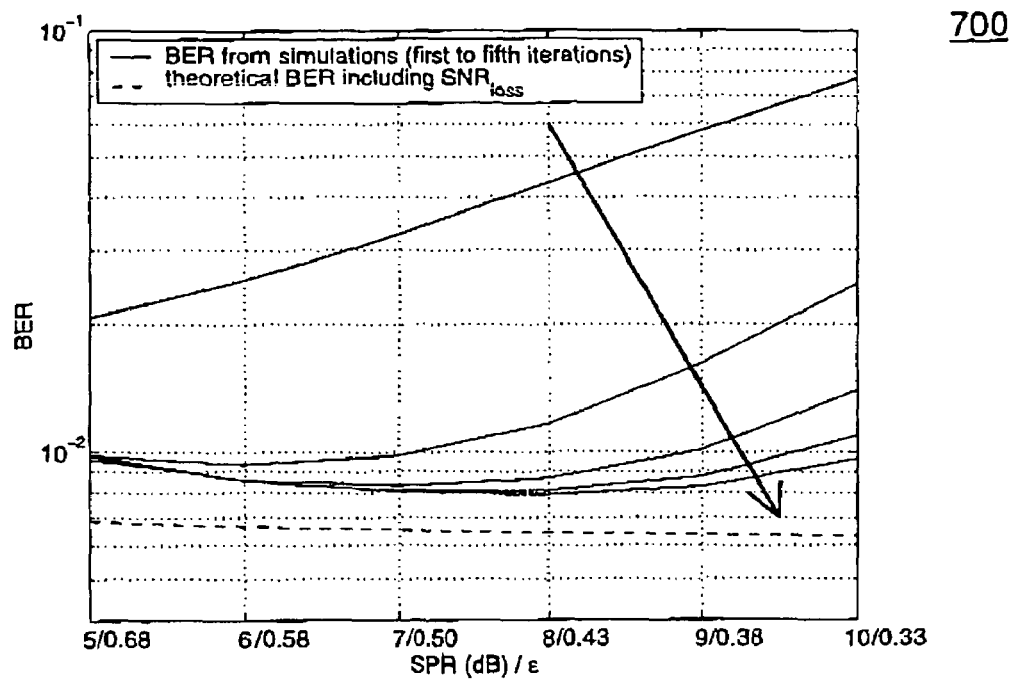
FIGS. 7 and 8 shows comparative simulation results of the performance of the communication system in FIG. 3 and prior art communication systems.

With reference to FIG. 7, consider first, the bit error rate (BER) performance at a maximum normalized Doppler spread $f_D T_s$, of 0.005. Setting $\Delta_N$=$\Delta_L$=15, the BER for the APSB scheme using different ε(SPR) for the first to fifth iterations. A high SPR means that low amount of power is used for pilot transmission while a small SPR means that low amount of power is used for data. Both extreme cases imply that $\hat{h}_F(n,l)$ will be badly estimated. Hence, for each iteration, there exist an optimum point whereby the SPR will minimize the BER. It is observed that as the number of iterations increases, the performance improves, but at a diminishing marginal amount.

For the prior art PSAM scheme, as we increase η, the channel estimation improves. However, since $SNR_{loss}$ also increases, less power is allocated for the data for a given SNR. Thus, the improvement of the BER brought about by better channel estimation would be offset at some point as η increases. Consequently, there is an optimum η that minimizes the BER as well.

With both the prior art PSAM scheme and the APSB scheme, performance improves when larger filter taps are used i.e. larger $\Delta_N$ and $\Delta_L$. For the PSAM scheme, the performance also improves for smaller $\Delta_N$ and $\Delta_L$ when closer sampling intervals are employed, while for the APSB scheme, more iterations (K) results in better performance, although the marginal performance gain would decrease for both cases. Hence, the system design is flexible since increased complexity of the PSAM scheme, and the APSB scheme would improve performance. However, the APSB scheme, in accordance with the present invention as described, advantageously does not suffer bandwidth loss in contrast to the PSAM scheme which will always, have loss of bandwidth.

In general the BER is relatively robust to the selection of ε and η, and is consistent for other values of $\Delta_N$ (=$\Delta_L$), $\Delta_N$ (=$\Delta_L$), and different values of Doppler spread. Optimum values selected are as $\epsilon_0$=0.43 and $\eta_0$=4/3 that minimize BER.

Figure 8:
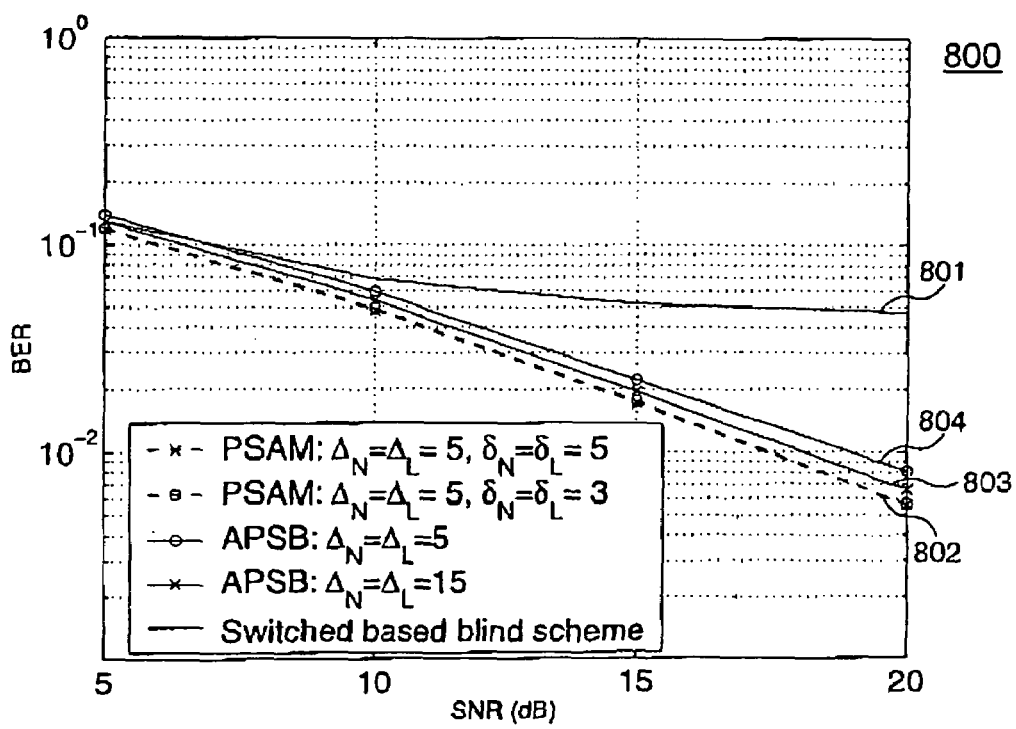

With reference to FIG. 8, assuming that the SNR is known, the graph shows a plot of BER vs SNR for the prior art switched based blind scheme 801, and PSAM 802 scheme, and the APSB scheme 803 and 804, using $\epsilon_0$=0.43 and $\eta_0$=4/3, at $f_D T_s$=0.005. It is observed that when $\Delta_N$=$\Delta_L$=15, plot 803, the SNR of the of the APSB scheme is 1 dB worse than the PSAM scheme. However, the BER performance of the APSB scheme is superior to the switched based blind scheme.

The present invention, as described, provides an added pilot semi-blind scheme that does not consume bandwidth, and is suitable for use in a mobile communication system.

This is accomplished by adding data and pilot data at the transmitter prior to transmission on a communication channel, and using a 2-D Wiener filter to recover the transmission characteristics of the communication channel using the pilot data. Then through an iterative process of estimating the communication channel and estimating the data, the communication channel can be estimated and the transmitted data recovered.

The present invention provides a method and an apparatus for semi-blind communication channel estimation, which overcomes, or at least reduces the abovementioned problems of the prior art.

It will be appreciated that although only one particular embodiment of the invention has been described in detail, various modifications and improvements can be made by a person skilled in the art without departing from the scope of the present invention.

We claim:

1. A multi-carrier communication system comprising:
    a transmitter comprising:
        a data input for receiving an unknown data signal for transmission;
        a known data input for receiving a known data signal;
        a signal power ratio input for receiving a power ratio signal indicating a ratio for combining the unknown data signal and the known data signal; and
        a data combiner coupled to the data input, the known data input and the signal power ratio input, the data combiner for combining the unknown data signal and the known data signal in accordance with the power ratio signal to produce a composite output signal comprising discrete data signals, wherein each discrete data signal comprises at least a portion of the unknown data signal and at least a portion of the known data signal combined in accordance with the power ratio signal, the data combiner having an output adapted to provide the composite output signal to a multi-carrier transmitter, wherein the multi-carrier transmitter transmits a transmit signal on a communication channel, wherein the transmit signal includes the composite output signal; and a receiver comprising:

a multi-carrier receiver for receiving a receive signal corresponding to the transmit signal on the communication channel, and the multi-carrier receiver having an output for providing a corresponding composite signal, wherein the corresponding composite signal comprises corresponding discrete data signals, and the corresponding composite signal being shaped by at least one signal shaping characteristic of the communication channel;

a channel estimator having a known data input for receiving the known data signal, an input coupled to receive the corresponding composite signal, an input coupled to receive the power ratio signal, and an input for receiving at least one estimate of the unknown data signal, the channel estimator for estimating the at least one signal shaping characteristic of the communication channel from at least the corresponding composite signal, the at least the portion of the known data signal of at least some of the corresponding discrete data signals, the power ratio signal and the at least one estimate of the unknown data signal, and the channel estimator having an output for providing at least one estimated communication channel characterising signal; and an equalizer coupled to receive the corresponding composite signal, the known data signal, the power ratio signal and the at least one estimated communication channel characterizing signal, the equalizer for configuring at least one of its signal shaping characteristics to compensate for the at least one signal shaping characteristic of the communication channel, the configured equalizer for shaping the corresponding composite signal accordingly, and the equalizer having an output for providing at least one subsequent estimate of the unknown data signal.

2. A multi-carrier communication system in accordance with claim 1 wherein the data combiner further comprises:

a data conditioner coupled to receive the unknown data signal and the power ratio signal, the data conditioner for changing the power level of the unknown data signal substantially in accordance with the power ratio signal, and the data conditioner being adapted to provide a conditioned unknown data signal;

a pilot conditioner coupled to receive the known data signal and the power ratio signal, the pilot conditioner for changing the power level of the known data signal substantially in accordance with the power ratio signal, and the pilot conditioner being adapted to provide a conditioned known data signal; and an adder coupled to receive the conditioned unknown data signal and the conditioned known data signal, for combining the conditioned unknown data signal and the conditioned known signal, and the adder coupled to provide the discrete data signals.

3. A multi-carrier communication system in accordance with claim 1 further comprising a memory for storing the known data signal, and the memory being coupled to provide the known data signal to the channel estimator and the equalizer.

4. A multi-carrier communication system in accordance with claim 1 further comprising a memory for storing the power ratio signal, and the memory being coupled to provide the power ratio signal to the channel estimator and the equalizer.

5. A multi-carrier communication system in accordance with claim 1 wherein the multi-carrier transmitter comprises a serial to parallel converter having an input coupled to the output of the data combiner, and having a plurality of outputs for providing a plurality of sub-composite signals.

6. A multi-carrier communication system in accordance with claim 5 wherein the multi-carrier transmitter further comprises a multi-channel modulator having a plurality of inputs coupled to the plurality of outputs of the serial to parallel converter, the multi-channel modulator for modulating each of the plurality of sub-composite signals on at least one of the plurality of sub-carrier signals, and the multi-channel modulator having a plurality of outputs for providing the plurality of modulated sub-carrier signals.

7. A multi-carrier communication system in accordance with claim 6, wherein the multi-channel modulator comprises an inverse discrete Fourier transform module.

8. A multi-carrier communication system in accordance with claim 6 wherein the multi-carrier transmitter further comprises a parallel to serial converter having a plurality of inputs coupled to the plurality of outputs of the multi-channel modulator, and having a data output for providing a serial data signal.

9. A multi-carrier communication system in accordance with claim 8 wherein the multi-carrier transmitter further comprises a cyclic prefix adder having an input for receiving the serial data signal, the cyclic prefix adder for adding at least one predetermined data prefix to the serial data signal to produce the transmit signal, and having an output for providing the transmit signal on the communication channel.

10. A multi-carrier communication system in accordance with claim 1 wherein the multi-carrier receiver comprises a cyclic prefix remover having an input coupled to receive the receive signal on the communication channel, the cyclic prefix remover for removing the at least one predetermined data prefix from the receive signal, and the cyclic prefix remover having an output for providing a corresponding serial data signal.

11. A multi-carrier communication system in accordance with claim 10 wherein the multi-carrier receiver further comprises a serial to parallel converter having an input for receiving the corresponding serial data signal, and having an output for providing a plurality of modulated sub-carrier signals.

12. A multi-carrier communication system in accordance with claim 11 wherein the multi-carrier receiver further comprises a multi-channel demodulator having a plurality of inputs for receiving the plurality of modulated sub-carrier signals and having a plurality of outputs for providing a plurality of sub-composite signals.

13. A multi-carrier communication system in accordance with claim 12 wherein the multi-channel demodulator comprises a discrete Fourier transform module.

14. A multi-carrier communication system in accordance with claim 13 wherein the multi-carrier receiver further comprises a parallel to serial converter having a plurality of inputs for receiving the plurality of sub-composite signals, and having an output for providing the corresponding composite signal.

15. A multi-carrier communication system in accordance with claim 1 wherein at least part of the channel estimator and at least part of the equaliser comprise a 2-D Weiner filter.

16. A multi-carrier transmitting system comprising:
a data input for receiving an unknown data signal for transmission;
a known data input for receiving a known data signal;
a signal power ratio input for receiving a power ratio signal indicating a ratio for combining the unknown data signal and the known data signal; and
a data combiner coupled to the data input, the known data input and the signal power ratio input, the data combiner for combining the unknown data signal and the known data signal in accordance with the power ratio signal to produce a composite output signal comprising discrete data signals, wherein each discrete data signal comprises at least a portion of the unknown data signal and at least a portion of the known data signal combined in accordance with the power ratio signal, the data combiner having an output adapted to provide the composite output signal to a multi-carrier transmitter, wherein the multi-carrier transmitter transmits a transmit signal on a communication channel, wherein the transmit signal includes the composite output signal;
wherein the data combiner further comprises:
a data conditioner coupled to receive the unknown data signal and the power ratio signal, the data conditioner for changing the power level of the unknown data signal substantially in accordance with the power ratio signal, and the data conditioner being adapted to provide a conditioned unknown data signal;
a pilot conditioner coupled to receive the known data signal and the power ratio signal, the pilot conditioner for changing the power level of the known data signal substantially in accordance with the power ratio signal, and the pilot conditioner being adapted to provide a conditioned known data signal; and
an adder coupled to receive the conditioned unknown data signal and the conditioned known data signal, for combining the conditioned unknown data signal and the conditioned known signal, and the adder coupled to provide the each discrete data signals.

17. A multi-carrier transmitting system in accordance with claim 16 wherein the data combiner comprises a frequency domain data combiner for adding the varying data signal and the known data signal in the frequency domain.

18. A multi-carrier transmitting system in accordance with claim 17 wherein the frequency domain data combiner is adapted to provide an output signal thus:

$x_F(n,l)=d_F(n,l)+p_F(n,l), \forall (n,l) \in S.$

19. A multi-carrier transmitting system in accordance with claim 16, wherein the multi-carrier transmitter further comprises a serial to parallel converter having an input coupled to the output of the data combiner, and having a plurality of outputs for providing a plurality of sub-composite signals..

20. A multi-carrier transmitting system in accordance with claim 19 wherein the multi-carrier transmitter further comprises a multi-channel modulator having a plurality of inputs coupled to the plurality of outputs of the serial to parallel converter, the multi-channel modulator for modulating each of the plurality of sub-composite signals on at least one of the plurality of sub-carrier signals, and the multi-channel modulator having a plurality of outputs for providing the plurality of modulated sub-carrier signals.

21. A multi-carrier transmitting system in accordance with claim 20, wherein the multi-channel modulator comprises an inverse discrete Fourier transform module.

22. A multi-carrier transmitting system in accordance with claim 20 wherein the multi-carrier transmitter further comprises a parallel to serial converter having a plurality of inputs coupled to the plurality of outputs of the multi-channel modulator, and having a data output for providing a serial data signal.

23. A multi-carrier transmitting system in accordance with claim 22 wherein the multi-carrier transmitter further comprises a cyclic prefix adder having an input for receiving the serial data signal, the cyclic prefix adder for adding at least one predetermined data prefix to the serial data signal to produce the transmit signal, and having an output for providing the transmit signal on the communication channel.

24. A multi-carrier receiving system comprising:
a multi-carrier receiver for receiving a receive signal on a communication channel, where in the receive signal includes a composite signal, and the multi-carrier receiver having an output for providing the composite signal, wherein the composite signal comprises discrete data signals, and wherein each discrete data signal comprises at least a portion of an unknown data signal and at least a portion of a known data signal combined in accordance with a signal power ratio signal, the composite signal being shaped by at least one signal shaping characteristic of the communication channel;
a channel estimator having a known data input for receiving the known data signal, an input coupled to receive the composite signal, an input coupled to receive the power ratio signal, and an input for receiving at least one estimate of the unknown data signal, the channel estimator for estimating the at least one signal shaping characteristic of the communication channel from at least the composite signal, the at least the portion of the known data signal of at least some of the discrete data signals, the power ratio signal and the at least one estimate of the unknown data signal, and the channel estimator having an output for providing at least one estimated communication channel characterizing signal; and
an equalizer coupled to receive the composite signal, the known data signal, the power ratio signal and the at least one estimated communication channel characterizing signal, the equalizer for configuring at least one of its signal shaping characteristics to compensate for the at least one signal shaping characteristic of the communication channel, the configured equalizer for shaping the composite signal accordingly, and the equalizer having an output for providing at least one subsequent estimate of the unknown data signal.

25. A multi-carrier receiving system in accordance with claim 24 further comprising a memory for storing the known data signal, and the memory being coupled to provide the known data signal to the channel estimator and the equalizer.

26. A multi-carrier receiving system in accordance with claim 24 further comprising a memory for storing the power ratio signal, and the memory being coupled to provide the power ratio signal to the channel estimator and the equalizer.

27. A multi-carrier receiving system in accordance with claim 24 wherein the multi-carrier receiver comprises a cyclic prefix remover having an input coupled to receive the receive signal on the communication channel, the cyclic prefix remover for removing at least one predetermined data prefix from the receive signal, and the cyclic prefix remover having an output for providing a corresponding serial data signal.

28. A multi-carrier receiving system in accordance with claim 27 wherein the multi-carrier receiver further comprises a serial to parallel converter having an input for receiving the corresponding serial data signal, and having an output for providing a plurality of modulated sub-carrier signals.

29. A multi-carrier receiving system in accordance with claim 28 wherein the multi-carrier receiver further comprises a multi-channel demodulator having a plurality of inputs for receiving the plurality of modulated sub-carrier signals and having a plurality of outputs for providing a plurality of sub-composite signals.

30. A multi-carrier receiving system in accordance with claim 29 wherein the multi-channel demodulator comprises a discrete Fourier transform module.

31. A multi-carrier receiving system in accordance with claim 29 wherein the multi-carrier receiver further comprises a parallel to serial converter having a plurality of inputs for receiving the plurality of sub-composite signals, and having an output for providing the corresponding composite signal.

32. A multi-carrier receiving system in accordance with claim 24 wherein at least part of the channel estimator and at least part of the equaliser comprise a 2-D Weiner filter.

33. A method for determining received data in a multi-carrier communication system, wherein a received signal includes a composite signal received on a communication channel having transmission characteristics, wherein the composite signal comprises a plurality of discrete data signals spaced in time and frequency, and wherein each discrete data signal comprises a data portion and a pilot portion, wherein the data portion comprises one of a predetermined group of symbols, the method comprising the steps of:

a) defining a set of the plurality of discrete data signals;
b) setting a predetermined number of iterations;
c) receiving the composite signal on the communication channel;
d) selecting one of the plurality of discrete data signals to be estimated;
e) selecting a group of the plurality of discrete data signals, wherein each discrete data signal of the group of the plurality of discrete data signals is relevant to determining the one of the plurality of data signals;
f) normalising the group of the plurality of discrete data signals using at least the pilot portion of the one of the plurality of discrete data signals;

g) estimating the transmission characteristics of the communication channel using the normalized group of the plurality of discrete data signals in step (f); and
h) estimating the data portion of the one of the plurality of discrete data signals using the communication channel having the transmission characteristics estimated in step (g) and at least the pilot portion of the one of the plurality of discrete data signals.

34. A method in accordance with claim 33 further comprising the step of:
i) deciding which symbol of the predetermined group of symbols is received from the estimated data portion of the one of the plurality of discrete data signals in step (h).

35. A method in accordance with claim 34 further comprising the step of:
j) determining whether the data portion of all of the group of the plurality of discrete data signals have been determined.

36. A method in accordance with claim 35 further comprising the step of:
k) when the determination in step (j) is not true, selecting another of the plurality of discrete data signals to be determined and repeating steps (e) to (j).

37. A method in accordance with claim 36 further comprising the step of:
l) repeating step (k) until the decision in step (j) is true.

38. A method in accordance with claim 36, further comprising in each iteration of steps (e) to (j), the step of:
m) using the estimated data portion from at least one previous iteration in step (g) to estimate the transmission characteristics of the communication channel.

39. A method in accordance with claim 35 further comprising, when the data portion of all of the group of the plurality of discrete data signals have been determined, the step of:
n) determining whether the predetermined number of iterations set in step (b) have been completed.

40. A method in accordance with claim 39 further comprising, when the predetermined number of iterations set in step (b) have not been completed, the step of:
o) repeating steps (d) to (n) until the predetermined number of iterations have been completed.

* * * * *